US008158550B2

(12) United States Patent
Cimino et al.

(10) Patent No.: US 8,158,550 B2
(45) Date of Patent: Apr. 17, 2012

(54) MULTILAYER CATALYST, PROCESS FOR THE PREPARATION AND USE THEREOF IN THE PARTIAL OXIDATION OF HYDROCARBONS IN GASEOUS PHASE

(75) Inventors: Stefano Cimino, Naples (IT); Francesco Donsi, Naples (IT); Raffaele Pirone, Naples (IT); Gennaro Russo, Naples (IT)

(73) Assignee: Consiglio Nazionale Delle Ricerche, Rome (IT)

( * ) Notice: Subject to any disclaimer, the term of this patent is extended or adjusted under 35 U.S.C. 154(b) by 1385 days.

(21) Appl. No.: 10/558,195

(22) PCT Filed: May 26, 2004

(86) PCT No.: PCT/EP2004/005808
§ 371 (c)(1),
(2), (4) Date: Dec. 4, 2006

(87) PCT Pub. No.: WO2004/105937
PCT Pub. Date: Dec. 9, 2004

(65) Prior Publication Data
US 2007/0100190 A1    May 3, 2007

(30) Foreign Application Priority Data
May 28, 2003    (IT) .............................. RM03A000259

(51) Int. Cl.
*B01J 23/00*    (2006.01)
(52) U.S. Cl. ........ 502/302; 502/303; 502/304; 502/305; 502/306; 502/308; 502/309; 502/313; 502/314; 502/315; 502/316; 502/317; 502/319; 502/321; 502/324; 502/325; 502/326; 502/327; 502/328; 502/329; 502/330; 502/332; 502/340; 502/341; 502/344; 502/348; 502/349; 502/355; 502/527.13; 502/352
(58) Field of Classification Search .................. 558/658; 502/302–354
See application file for complete search history.

(56) References Cited

U.S. PATENT DOCUMENTS
4,119,701 A * 10/1978 Fedor et al. ................. 423/213.2
5,789,339 A * 8/1998 Ziebarth et al. ............... 502/303

FOREIGN PATENT DOCUMENTS
DE    36 44 377    7/1988

OTHER PUBLICATIONS

Liebmann et al., Oxidative dehydrogenation of isobutane at short contact times, 1993, Applied Catalysis A: General, 179, 93-106.*

(Continued)

Primary Examiner — Jerry Lorengo
Assistant Examiner — Pritesh Darji
(74) Attorney, Agent, or Firm — Oblon, Spivak, McClelland, Maier & Neustadt, L.L.P.

(57) ABSTRACT

The invention relates to a multilayer catalyst for the partial oxidation of hydrocarbons in gaseous phase, comprising a monolithic ceramic or metallic substrate having a solid macroporous structure consisting of one or more structures, on which a first active layer with a crystal-line perovskitic structure is deposited, having general formula $A_xA'_{1-x}B_yB'_{1-y}O_{3\pm\delta}$ wherein: A is a cation of at least one of the rare earth elements, A' is a cation of at least one element selected from groups Ia, IIa and VIa of the periodic table of elements, B is a cation of at least one element selected from groups IVb, Vb, VIb, VIIb, or VIII of the periodic table of elements, B' is a cation of at least one element selected from groups IVb, Vb, VIb, VIIb or VIII of the periodic table of elements $Mg^{2+}$ or $Al^{3+}$, x is a number which is such that $0 \leq x \leq 1$, y is a number which is such that $0 \leq y \leq 1$, and $\delta$ is a number which is such that $0 \leq \delta \leq 0,5$, a second more external active layer consisting of a dispersion of a noble metal and a possible supporting layer with a large surface area, positioned between said monolithic substrate and said first active layer with a perovskitic structure. The invention also relates to a process for the production of said catalyst and its use for the partial oxidation of hydrocarbons in gaseous phase.

54 Claims, 8 Drawing Sheets

OTHER PUBLICATIONS

Donsi, Francesco et al.: "Oxidative Dehydrogenation of Ethane over a Perovskite-Based Monolithic Reactor", Journal of Catalysis, vol. 209, No. 1, pp. 51-61, 2002.

Huff M. et al: "Ethylene Formation by Oxidative Dehydrogenation of Ethane over Monoliths at Very Short Contact Times", Journal of Physical Chemistry, vol. 97, No. 45, pp. 11815 to 11822, 1993.

Henning, D.A. et al.: "Oxidative dehydrogenation of ethane at short contact times: species and temperature profiles within and after the catalyst", Chemical Engineering Science, vol. 57, No. 14, pp. 2615 to 2625, 2002.

Cimino S. et al.: "Zirconia supported $LaMnO_3$ monoliths for the catalytic combustion of methane", Applied Catalysis B. Environmental, vol. 35, No. 4, pp. 243 to 254, 2002.

* cited by examiner

MULTILAYER CATALYST, PROCESS FOR THE PREPARATION AND USE THEREOF IN THE PARTIAL OXIDATION OF HYDROCARBONS IN GASEOUS PHASE

The present invention relates to a multilayer catalyst, a process for the preparation and use thereof for the partial oxidation of hydrocarbons in gaseous phase.

More specifically, the invention relates to the partial oxidation field of light paraffin hydrocarbons to obtain olefins.

The partial oxidation of light hydrocarbons has been studied, particularly during the last ten years, as an alternative to thermal cracking for the production of olefins (Schmidt, L. D. et al., Aiche J. 46:1492 (2000)).

Thermal cracking processes do in fact have numerous drawbacks. In the case of the production of ethylene through the dehydrogenation of ethane, for example, the process, which is effected in a homogeneous phase, is endothermic, and temperatures of around 850° C. are required to allow it to take place at a reasonable rate.

For this reason, the external surface of the reaction tubes must be heated by exposure to flames, which not only means that the structures must be manufactured using materials which are resistant to very high temperatures, but also that there is the formation of thermal $NO_x$. Moreover, this kind of reactor has the drawback of the formation of coke, due to the long exposure times of the ethane to high temperatures (about 1 s).

If the process is carried out by adding oxygen in the feedstock (oxidative dehydrogenation) and in the presence of an oxidation catalyst, the whole reaction becomes exothermic and the process is thermally self-sustaining.

The advantages in terms of materials considerably exceed the disadvantage linked to the separation of the oxygen. With the addition of oxygen, in fact, there is no longer the necessity of exposing the reaction tubes to flames, as the heat is produced in situ inside the reactor. A further advantage lies in the fact that the formation of thermal $NO_x$ is reduced by the comparatively low temperatures (below 1000° C.) and by the absence of flames. Finally, the formation of coke is considerably reduced by the presence of the catalyst and the reduced residence time of the reagents in the high temperature zone (about 0.005 s).

Oxidative dehydrogenation processes can be divided into purely catalytic processes or processes with a mixed hetero-homogeneous mechanism. The latter are certainly more interesting on an industrial scale, whereas the former are limited, by the low operating temperature, with respect to the olefin yield that can be obtained (Cavani F. and Trifiró F., Catal. Today 24:307 (1995)).

U.S. Pat. No. 4,940,826 was the first to describe a catalyst based on platinum laid on a support, preferably an alumina, in the form of spheres or granules, preferably in a monolithic form, for the production of monoolefins through the catalytic oxidative dehydrogenation of light hydrocarbons. Said patent also suggested the addition of hydrogen to the feedstock to the catalyst, in order to enhance the olefin yield. Platinum is a catalyst capable of tolerating the combustion of hydrocarbon-oxygen mixtures above the upper flammability limit. As demonstrated by recent studies, the feeding of large amounts of reagents (mixtures of hydrocarbons and oxygen) to this catalyst generates an autothermal process which is carried out through the catalytic oxidation of a fraction of hydrocarbon on the platinum surface, whereas the remaining hydrocarbon fraction generates oxidative dehydrogenation reactions in gas phase, for the production of olefins (Beretta A. et al.,Chem.Eng. ci. 56:779 (2001)).

After the disclosure of the patent content, the oxidative dehydrogenation of ethane in catalysts based on noble metals was studied in depth by the research team of Professor L. Schmidt of the University of Minnesota, arousing interest in the partial oxidation processes of light hydrocarbons. It has been demonstrated, since 1993, that olefins can be produced by means of the autothermal oxidative dehydrogenation of light hydrocarbons in structured reactors containing platinum, operating at high space velocities (in the order of milliseconds) and at temperatures ranging from 900 to 1000° C. (Huff M. C., e Schmidt L. D., J. Phis. Chem. 97:11815 (1993)). Under these conditions, and starting from. an ethane-oxygen mixture having a molar ratio close to the stoichiometric value, for the oxidative dehydrogenation of ethane (i.e.=$C_2H_6/O_2$=2), the ethylene yield is so high that it can be compared to the existing cracking processes. The selection of catalysts based on platinum for this process, is the result of studies which have compared the activity of several noble metals, in high space velocity reactors for partial oxidation processes, reaching the conclusion that platinum is the optimal active phase for oxidative dehydrogenation, whereas rhodium is the most suitable in partial oxidation to synthesis gas (Schmidt et al., Chem. Eng. Sci. 49:3981 (1994)).

An improvement in the catalyst based on platinum was obtained by the same research team, who describes, in U.S. Pat. No. 6,072,097, an innovative catalyst for the production of mono-olefins from gaseous paraffinic hydrocarbons. The catalyst described in the patent consists of a ceramic monolith support covered with a platinum active phase to which a layer of tin or cupper is added. The addition of tin or copper, as mentioned by the authors, causes an improvement in the performances with respect to platinum alone, with an increase in the ethylene yield (Yokoyama C., et al., Catal. Lett. 38:181 (1996)). Moreover, the selectivity to olefins is further increased by the addition of molecular hydrogen to the feedstock, causing the substitution of the hydrocarbon, which acts as a sacrificial fuel, with hydrogen. Catalysts based on Sn/Pt or Cu/Pt, however, have the disadvantage of a high volatility of tin and copper, which causes serious limits to the duration of the catalyst.

Some studies have also considered the use of alternative materials to noble metals. In particular, it has been proved that the use of ceramic monoliths based on $Cr_2O_3$, in the oxidative dehydrogenation of ethane, allows very promising performances to be reached, but which is limited however by the rapid deactivation of the catalyst (Flick, D. W., Huff, M. C., Appl. Catal. A 187:13 (1999)).

A structured catalyst has also been proposed, based on hexa-aluminates ($BaMnAl_{11}O_{19}$) (Beretta, A., and Forzatti, P., J. Catal. 200:45 (2001)). This material is extremely thermally stable, but less active compared to platinum, and causes the formation of coke.

Finally, a work published by the same research team who developed the solution, object of the present invention, proposes a structured catalyst based on oxides of the perovskitic type ($LaMnO_3$), for the oxidative dehydrogenation of ethane to ethylene (Donsi et al., J. Catal. 209:51 (2002)). The high thermal stability of the catalyst, in addition to the good oxidation activity, allows a satisfactory running of the autothermal process, without problems relating to instability and the formation of coke. Furthermore, said perovskites show a certain intrinsic activity in the oxidative dehydrogenation of ethane, giving interesting performances as far as the yield to ethylene is concerned.

From a study of the limits of the solution of the known art, it emerges that it would be desiderable to prepare a catalyst which can combine the high activities of noble metals with a high thermal stability. Research in this direction has identified several materials, in which the noble metals are deposited on oxides, in turn with or without catalytic activity, or in which said noble metals are included in the structure of mixed oxides, used for oxidative dehydrogenation and other oxidation or non-oxidation processes. In addition to the stabilization of the noble metal, the metals proposed have the further advantage of using a lower quantity of said noble metals, due to the improved dispersion of the same, and of influencing the catalytic properties of the material through a suitable selection of the support.

U.S. Pat. No. 4,919,902 describes, among other solutions, a catalyst based on noble metals dispersed on an oxide of rare earth metals supported on a refractory in-organic oxide selected from alumina, silica, titanium oxide, zirconium oxide, alumino-silicates and mixtures thereof. The use of this composite material was contemplated for the oxidation of exhaust gas from combustion engines.

Furthermore, U.S. Pat. No. 5,877,377 relates to a catalyst consisting of a metal oxide incorporating palladium particles for the low temperature oxidative dehydrogenation iso-1-butene to butadiene. Palladium is incorporated into the catalyst to enhance its activity and carry out the reaction at a lower temperature.

The patent EP 0937697 describes a catalyst comprising a noble metal deposited on tin and zirconium oxide and a process, making use of this catalyst, for the oxidative dehydrogenation of an alkane (mainly iso-butane) to obtain an alkene, the reaction mix comprising oxygen. Also in this case, the presence of tin and zirconium oxide enhances the performances of the catalyst, particularly if hydrogen is added to the feedstock.

U.S. Pat. No. 3,897,367 describes a catalyst with an $ABO_3$ structure, of the perovskitic type, wherein 1 to 20% of the cations in B position are substituted by Ru or Pt. This catalyst can be used in the oxidation reactions of exhaust gas. Furthermore, by substitution in the perovskitic structure, the noble metal is stabilized to resist high temperatures, through the reduction of the volatility of the pure noble metal. The activity of the perovskites obtained by the substitution, is significantly increased with respect to non-substituted perovskites.

Chinese patent 1,208,669, relating to a catalyst and oxidation process of a mix of methane and ethane for the production of ethylene, also describes oxides of the perovskitic type, based on titanium, partially substituted with Pt and Pd. A further example is disclosed in the article "Selective oxidation of methane and ethane to ethylene over $ABO_3$ perovskite catalysts" in the Journal Shiyou Huagong (1999), 28 (10), pages 653-656.

Finally, U.S. Pat. No. 5,508,257 describes a superconductor composite material wherein a metallic phase (Cu, Ag, Au, Pt, Ni, Zn) is deposited on a perovskitic or almost perovskitic oxide.

None of the above-mentioned patents suggests the use of a catalyst consisting of a noble metal deposited on an oxide of the perovskitic type for the partial oxidation of light alkanes.

The solution according to the present invention can be inserted within this context, as it proposes a catalyst for the partial oxidation of light paraffinic hydrocarbons in gaseous phase to obtain olefins, and has yield and selectivity characteristics which are enhanced with respect to the catalysts of the known art, at the same time, proving to be more stable during use.

A first specific object of the present invention therefore relates to a multilayer catalyst for the partial oxidation of hydrocarbons in gaseous phase, comprising a monolithic ceramic or metallic substrate having a solid, macroporous structure, consisting of one or more structures on which a first active layer is deposited, having a perovskitic crystalline structure and having the formula

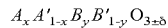

wherein:
A is a cation of at least one of the rare earth elements,
A' is a cation of at least one element selected from groups Ia, IIa and VIa of the periodic table of elements,
B is a cation of at least one element selected from groups IVb, Vb, VIb, VIIb or VIII of the periodic table of elements,
B' is a cation of at least one element selected from groups IVb, Vb, VIb, VIIb or VIII of the periodic table of elements, $Mg^{2+}$ or $Al^{3+}$,
x is a number which is such that $0 \leq x \leq 1$,
y is a number which is such that $0 \leq y \leq 1$, and
δ is a number which is such that $0 \leq \delta \leq 0,5$,
a second more external active layer-consisting of a dispersion of a noble metal and a possible supporting layer with a large surface area, positioned between said monolithic substrate and said first active layer with a perovskitic structure.

According to the invention, said solid macroporous structure of said ceramic or metal monolithic substrate, has pores with an average hydraulic diameter greater than 0.2 mm and with channels having a linear and parallel, or convoluted form, said average hydraulic diameter of the pores preferably being less than 1 mm.

Furthermore, according to the invention, said ceramic or metallic monolithic substrate consists of a non-active material in the reactions of interest and with a low thermal expansion coefficient, and it preferably consists of a material which can resist temperatures close to 1,000° C., chemically and physically stable, with no oxidation phenomena, or separation, volatility or phase transition at said temperatures.

According to the present invention, said ceramic monolith substrate can consist of an oxide, or a combination of oxides, preferably an oxide selected from $Al_2O_3$ (in the form of $\alpha$-$Al_2O_3$), SiC, $SiO_2$, $ZrO_2$, $Y_2O_3$, CaO, MgO and combinations thereof, in the form of ceramic foam or a ceramic honeycomb monolith.

As an alternative, again according to the invention, said metallic monolith substrate consists of an alloy of metals resistant to high temperature oxidation, preferably a metallic alloy selected from FeCrAlY, Nickel Cr, Nichrome, Hastelloy X, Inconel 600-625, produced in the form of metallic foam, or it consists of a metallic sheet and a corrugated sheet.

Still according to the invention, said first active layer having a crystalline perovskitic structure, can consist of an oxide with a high thermal stability at temperatures close to 1,000° C., a moderate oxidation activity, a good oxidation activity with respect to CO and also has the characteristic of being an atomic oxygen tank.

Furthermore, according to the present invention, in the general formula $A_x A'_{1-x} B_y B'_{1-y} O_{3\pm\delta}$, A is a cation of at least one element selected from La, Ce, Pr, Nd, Sm, En, Dy, Ho and Ef; A' is a cation of at least one element selected from Na, K, Ca, Sr, Ba, Rb; B is a cation of at least one element selected from Ti, Cr, Fe, Ru, Co, Rh, Ni, Mn, preferably selected from Cr, Fe, Co, Mn, Ni and Ru, and B' is a cation of at least one element selected from Ti, Cr, Fe, Ru, Co, Rh, Ni, Mn, Pt, Nb, Ta, Mo, W, preferably selected from Cr, Fe, Co, Mn, Ni, Mo, W and Ru.

According to the invention, said first active layer with a crystalline perovskitic structure preferably consists of $LaMnO_3$.

According to the present invention, said first active layer with a crystalline perovskitic structure is present in quantities of between 5 and 50% by weight, with respect to the sum of said first active layer and said possible supporting layer, in the presence of said possible supporting layer.

Said more external second active layer, according to the present invention, consists of a dispersion of a noble metal selected from Pt, Pd, Rh, Ir, Re, Au or a mixture thereof, preferably a dispersion of Pt, said more external second active layer being present in quantities ranging between 0.1 and 25%, preferably 0.1 and 15%, more preferably 1 and 10%, of the total weight of the catalyst, excluding the monolith substrate.

Again according to the invention, said possible supporting layer with a large surface area interposed between said monolith substrate and said first active layer with a perovskitic structure, consists of a material having a good chemical affinity with the material forming said ceramic or metallic monolithic substrate, preferably a non-active oxide in the reactions of interest, with a large surface area, ranging from 75 to 200 $m^2/g$, a low thermal expansion coefficient, compatible with that of said monolithic substrate.

Furthermore, still according to the present invention, said possible supporting layer with a large surface area, interposed between said monolithic layer and said first active layer with a perovskitic structure, consists of MgO, $MgAl_2O_4$, $\gamma-Al_2O_3$ stabilized or not by $La_2O_3$ or another stabilizer, or by $ZrO_2$ stabilized or not by $La_2O_3$ or another stabilizer, or by mixtures thereof, said stabilization being preferably obtained by means of an amount of $La_2O_3$ or other stabilizer, ranging from 5 to 10% by weight with respect to the total of said possible supporting layer having a large surface area.

Again according to the invention, the thickness of said possible supporting layer with a large surface area, interposed between said monolithic layer and said first active layer with a perovskitic structure, varies from a minimum of 5 µm to a maximum of 50% of the pore average radius of said substrate.

A second specific object of the present invention relates to a process for the preparation of a multilayer catalyst, as defined above, comprising the following phases in succession:
  deposition of said first active layer with a perovskitic crystalline structure on said ceramic or metallic monolithic substrate or on said possible supporting layer having a large. surface area,
  deposition of said second more external active layer consisting of a dispersion of a noble metal on said first active layer with a crystalline perovskitic structure,
  calcination in air at temperatures ranging from 700 to 1000° C.

According to the invention, said deposition of said first active layer having a crystalline perovskitic structure on said ceramic or metallic monolithic substrate or on said possible supporting layer a with large surface area, preferably takes place through the following sub-phases:
  impregnation with a water solution containing soluble compounds of the cations A, A', B and B' in the proportions corresponding to those of the desired final formulation,
  air calcination at temperatures of between 800 and 1000° C., for a time ranging from 2 hrs to 10 hrs.

Even more preferably, according to the present invention, said impregnation in said water solution is effected by means of a "wet impregnation" or "dry impregnation" process.

Alternatively, again according to the present invention, said deposition of said first active layer having a crystalline perovskitic structure on said ceramic or metallic monolithic substrate or on said possible supporting layer with a large surface area, is effected through the following sub-phases:

deposition-precipitation in situ starting from the soluble compounds of the cations A, A', B and B' in a water solution through the slow decomposition of urea at 90° C.;
  washing;
  drying;
  air calcination at temperatures of between 800 and 1000° C.

In a further alternative embodiment, according to the present invention, said deposition of said first active layer with a crystalline perovskitic structure on said ceramic or metallic monolithic substrate or on said possible supporting layer having a large surface area, is effected by means of a process comprising the sol/gel method or by means of the citrates method.

Still according to the present invention, said deposition of said second more external active layer on said first active layer with a crystalline perovskitic structure, can be effected through the following sub-phases:
  dry or wet impregnation in a salt solution of said noble metal in proportions corresponding to those of the desired final formulation,
  air calcination at temperatures of between 600 and 800° C., for a time ranging from 2 hrs to 10 hrs, said impregnation in said salt solution of said noble metal being preferably effected through a "wet" or "dry" process.

The process for the preparation of a multilayer catalyst according to the present invention can optionally include the following additional phases, which precede the deposition phase of said first active layer with a crystalline perovskitic structure:
  deposition of a supporting layer with a large surface area on said ceramic or metallic monolithic substrate,
  air calcination for about 3 hrs at high temperatures, for example of 800° C.

According to the present invention, said deposition of a supporting layer with a large surface area on a ceramic or metallic monolithic substrate preferably includes the following sub-phases, cyclically repeated until the desired thickness is reached:
  immersion of said substrate in a water solution containing a finely ground powder of supporting material,
  elimination from the substrate of the excess solution, said water solution containing a finely ground powder of supporting material in which said monolithic substrate is immersed, which can further contain a stabilizer precursor, a ligand in a weight percentage with respect to the total of up to 30% of said supporting material and nitric acid in a weight percentage of between 10 and 30% of said ligand.

Furthermore,. again according to the present invention, said elimination from the substrate of the excess solution is obtained through removal by means of compressed air and subsequent air calcination, for example at temperatures close to 550° C., or by flash evaporation of the water, for example by placing the impregnated monolith in an oven, for a few minutes, at a temperature higher than the water evaporation temperature (for example, between 200 and 500° C.).

A third specific object of the present invention relates to the use of the multilayer catalyst as defined above in partial oxidation processes of alkanes in gaseous phase.

A fourth specific object of the present invention also relates to the use of the multilayer catalyst as defined above in production processes of olefins starting from a gaseous stream of hydrocarbons, vaporizable within a temperature range of between 25° C. and 400° C. and pressures ranging from 0.1 to 5 atm, and oxygen.

Finally, a fifth specific object of the present invention relates to a partial oxidation process, for example for the production of olefins, starting from a gaseous stream of hydrocarbons, vaporizable within a temperature range of between 25° C. and 400° C. and pressures ranging from 0.1 to 5 atm, and oxygen, wherein said gaseous stream passes through a catalytic bed consisting of particles of multilayer catalyst, as defined above, said hydrocarbon comprising alkanes within the range of $C_2$-$C_{20}$, said gaseous stream also containing a quantity of oxygen which is such that the ratio between hydrocarbons and oxygen is within the range of 0.8 to 3 and in any case is always higher than the upper flammability limit of the mixture and a quantity of nitrogen ranging from 0 to 50% with respect to the total, said process being carried out at a pressure ranging from 0.1 to 5 MPa, a temperature ranging from 600 to 1200° C., with a space velocity ranging from $1 \cdot 10^7$ to $1 \cdot 10^3$ $hr^{-1}$.

In the partial oxidation process according to the present invention, said alkanes preferably comprise at least one product selected from ethane, propane, butane, or their mixtures.

Even more preferably, still according to the present invention, said ratio between hydrocarbons and oxygen is within the range of 1.25 and 3, said pressure ranges from 101 to 3,000 kPa, said temperature ranges from 800 to 1000° C. and said space velocity ranges from $3 \cdot 10^6$ to $3 \cdot 10^4$ $hr^{-1}$.

Furthermore, according to the present invention, said gaseous stream also comprises a quantity of hydrogen, freshly fed or recycled following the product separation, so that the ratio between hydrogen and oxygen is within the range of 0 and 3, and a quantity of CO, freshly fed or recycled following the product separation, so that the ratio between CO and oxygen is within the range of 0 and 3.

According to another preferred aspect of the present invention, said gaseous hydrocarbons stream comprises methane in an amount not higher than 20% by weight, preferably not higher than 5% by weight, of the total weight of the hydrocarbons. More preferably methane is substantially absent.

Finally, according to the invention, said gaseous stream of vaporizable hydrocarbons can be preheated to between 25 and 400° C. and before and after said catalytic bed there is preferably a layer of ceramic monoliths.

The details of the invention are described hereunder for illustrative but non-limiting purposes, with particular reference to various figures, in which:

FIG. 1 shows the conversion of ethane in relation to the ethane:oxygen ratio for a catalyst based on Pt/LaMnO$_3$ supported on γ-Al$_2$O$_3$ and deposited on a 45 ppi (pores per linear inch) foam, compared with a catalyst based on Pt and Pt/Sn on the same ceramic substrate under the same experimental conditions, for a total flow-rate equal to $2 \cdot 10^5$ $hr^{-1}$, with a dilution of N$_2$ equal to 30% vol;

Figure 8:
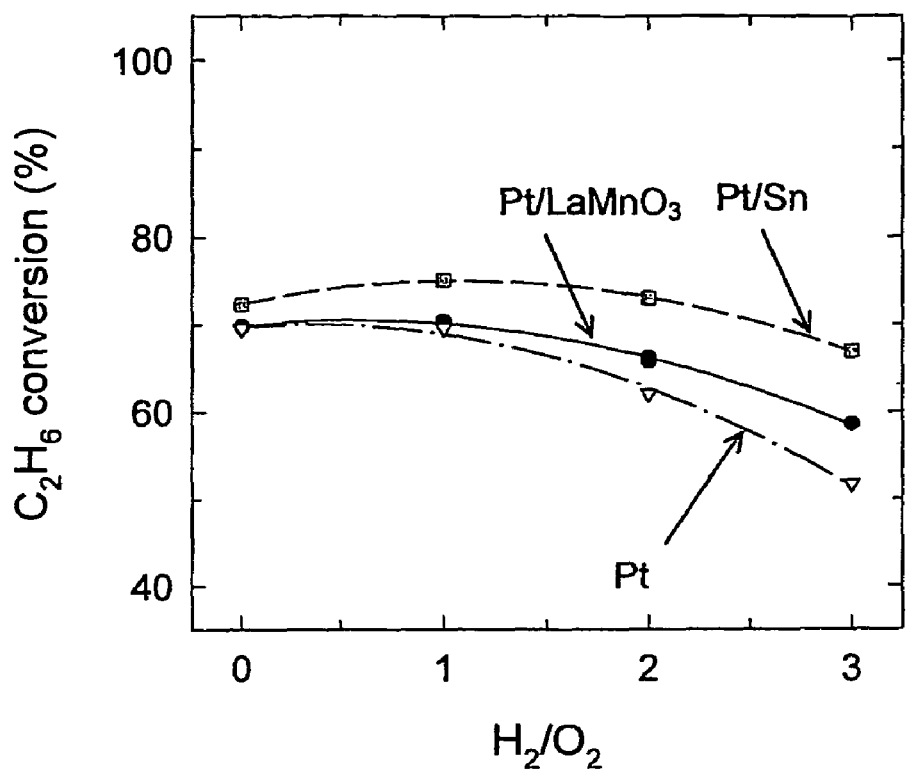
Figure 9:
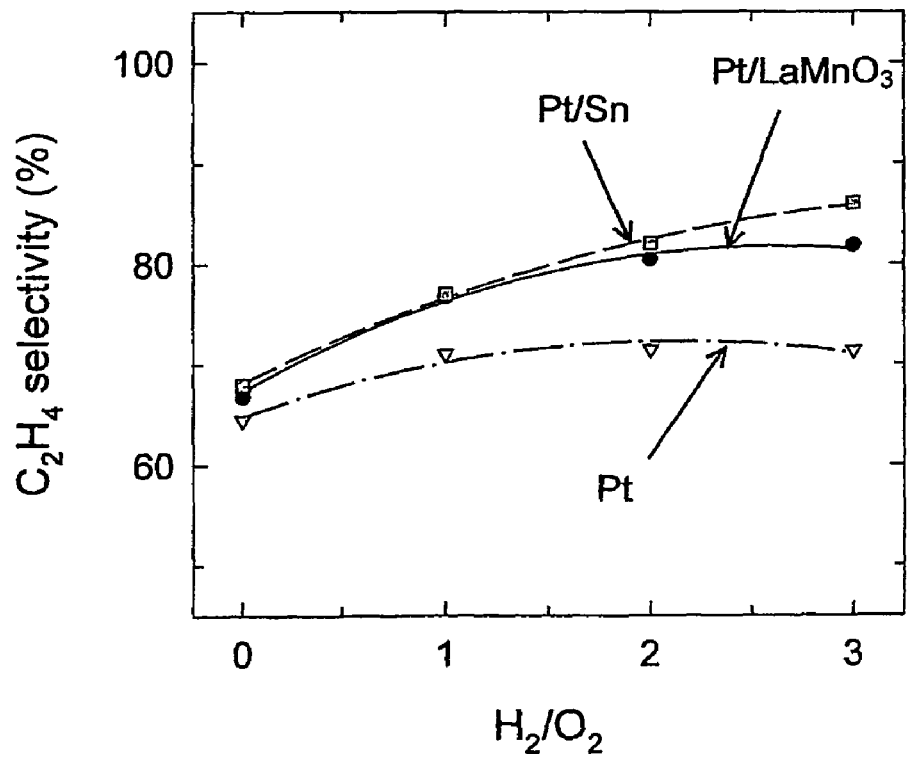
Figure 10:
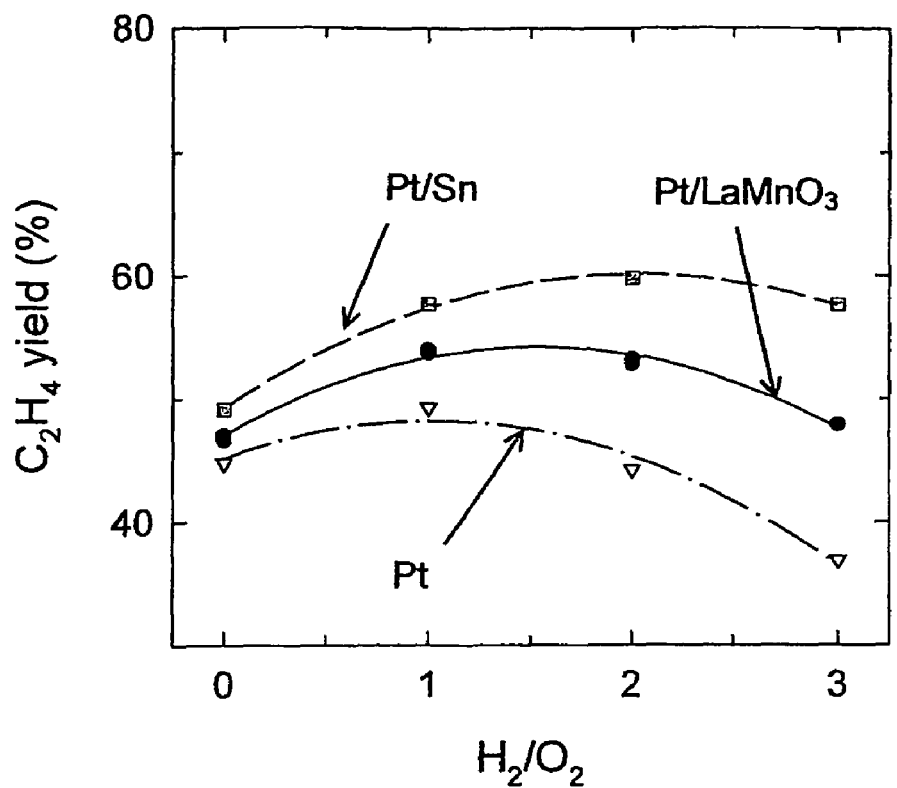
Figure 11:
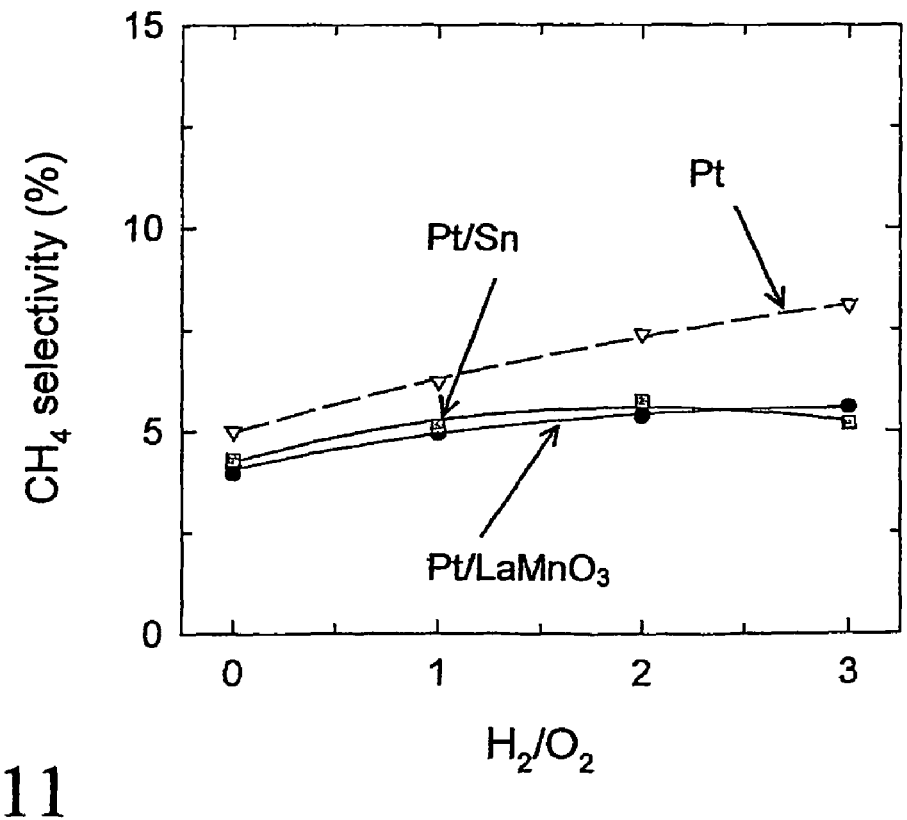
Figure 12:
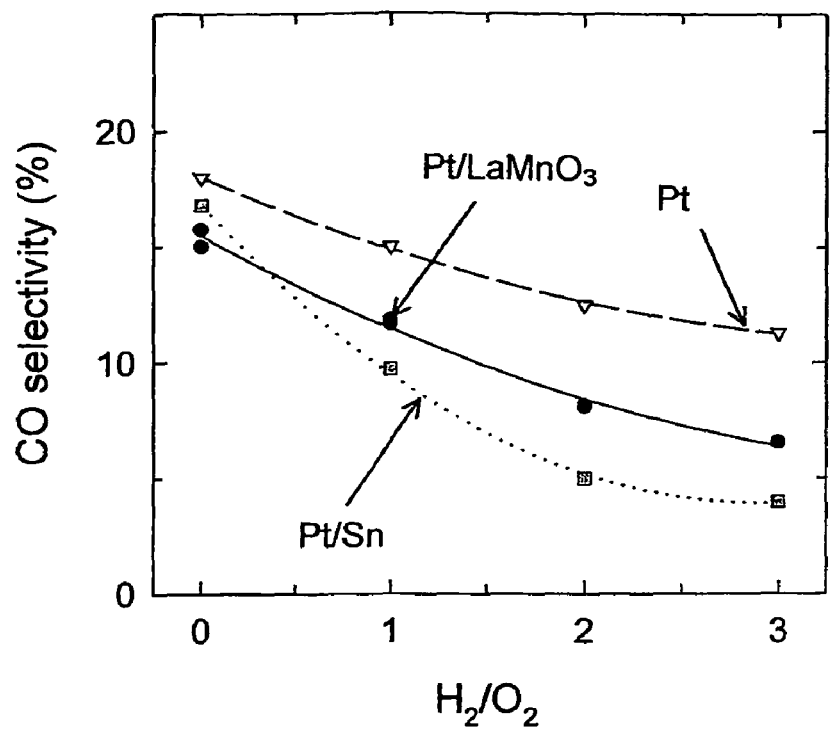
Figure 13:
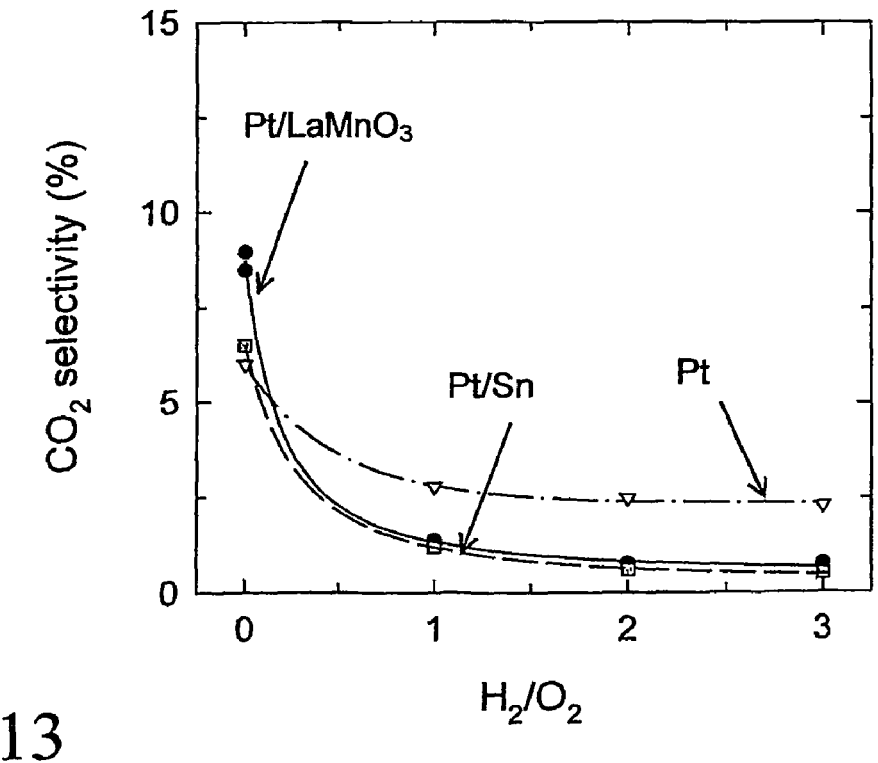
Figure 14:
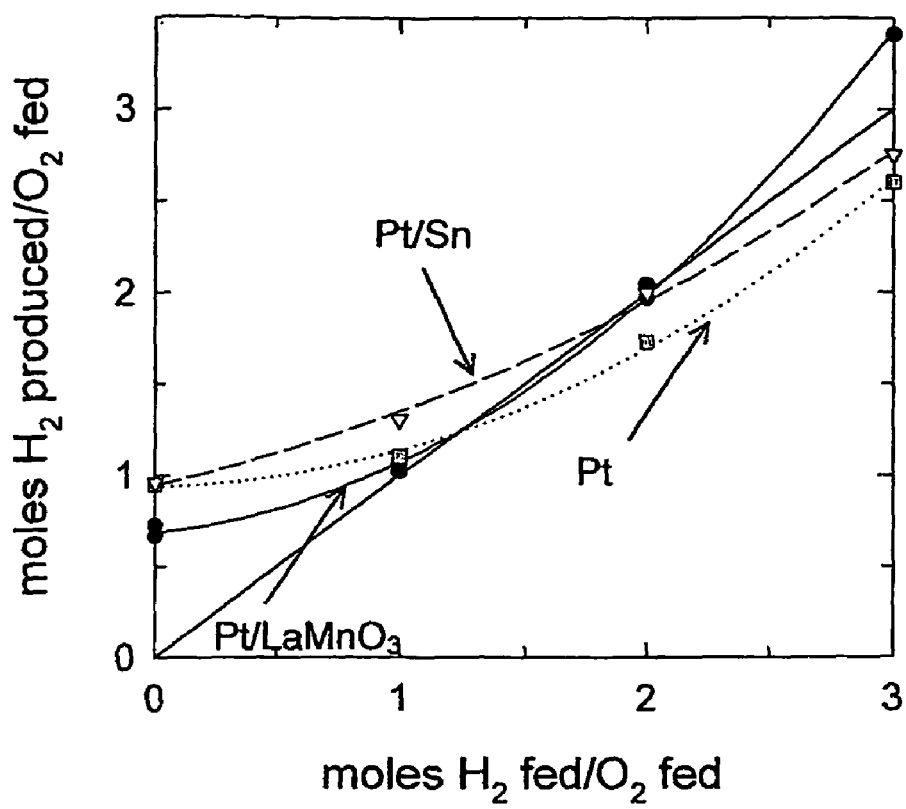

FIG. 8 shows the conversion of ethane in relation to the hydrogen:oxygen ratio for a catalyst based on Pt/LaMnO$_3$ supported on γ-Al$_2$O$_3$ and deposited on a 45 ppi (pores per linear inch) foam, compared with a catalyst based on Pt and Pt/Sn on the same ceramic substrate under the same experimental conditions for a flow-rate in the absence of H$_2$ equal to $2 \cdot 10^5$ $hr^{-1}$, and a C$_2$H$_6$:O$_2$:N$_2$ ratio equal to 46.7:23.3:30;

FIG. 9 shows the selectivity per carbon atom to ethylene in relation to the hydrogen:oxygen ratio for a catalyst based on Pt/LaMnO$_3$ supported on γ-Al$_2$O$_3$ and deposited on a 45 ppi (pores per linear inch) foam, compared with a catalyst based on Pt and Pt/Sn on the same ceramic substrate under the same experimental conditions specified in FIG. 8;

FIG. 10 shows the yield to ethylene in relation to the hydrogen:oxygen ratio for a catalyst based on Pt/LaMnO$_3$ supported on γ-Al$_2$O$_3$ and deposited on a 45 ppi (pores per linear inch) foam, compared with a catalyst based on Pt and Pt/Sn on the same ceramic substrate under the same experimental conditions specified in FIG. 8;

FIG. 11 shows the selectivity per carbon atom to CH$_4$ in relation to the hydrogen:oxygen ratio for a catalyst based on Pt/LaMnO$_3$ supported on γ-Al$_2$O$_3$ and deposited on a 45 ppi (pores per linear inch) foam, compared with a catalyst based on Pt and Pt/Sn on the same ceramic substrate under the same experimental conditions specified in FIG. 8;

FIG. 12 shows the selectivity per carbon atom to CO in relation to the hydrogen:oxygen ratio for a catalyst based on Pt/LaMnO$_3$ supported on γ-Al$_2$O$_3$ and deposited on a 45 ppi (pores per linear inch) foam, compared with a catalyst based on Pt and Pt/Sn on the same ceramic substrate under the same experimental conditions specified in FIG. 8;

FIG. 13 shows the selectivity per carbon atom to CO$_2$ in relation to the hydrogen:oxygen ratio for a catalyst based on Pt/LaMnO$_3$ supported on γ-Al$_2$O$_3$ and deposited on a 45 ppi (pores per linear inch) foam, compared with a catalyst based on Pt and Pt/Sn on the same ceramic substrate under the same experimental conditions specified in FIG. 8; and FIG. 14 shows the moles of H$_2$ produced per mole of O$_2$ fed in relation to the moles of H$_2$ fed per mole of O$_2$ fed for a catalyst based on Pt/LaMnO$_3$ supported on γ-Al$_2$O$_3$ and deposited on a 45 ppi (pores per linear inch) foam, compared with a catalyst based on Pt and Pt/Sn on the same ceramic substrate under the same experimental conditions specified in FIG. 8.

A detailed description of the invention is provided hereunder with the help of an example which forms an illustrative and non-limiting aspect of the scope of the present invention.

In this example, the preparation is described of a catalyst according to the present invention, together with the measurement procedures and catalytic activity results of a catalyst consisting of platinum dispersed on an oxide of the perovskitic type having the formula $LaMnO_3$, deposited on a layer of $\gamma$-$Al_2O_3$ and supported by a ceramic substrate in the form of a foam, in the oxidative dehydrogenation process of ethane for the production of ethylene.

Preparation of the Catalyst

A 45 ppi (pores per linear inch) ceramic foam, corresponding to an average pore diameter of 0.42 mm and a vacuum degree of about 80%, was used as substrate. Said ceramic substrate consists of 92% of $\alpha$-$Al_2O_3$ and the remaining percentage of mullite, with a disk-shaped configuration having a diameter of 17 mm and a thickness of 10 mm.

Said substrate was coated with a layer of $\gamma$-$Al_2O_3$ stabilized with lanthanum oxide by means of the following procedure. A slurry was prepared, containing 5% by weight of $\gamma$-$Al_2O_3$ in the form of particles having a micronic dimension in water. Lanthanum nitrate was added to this slurry in a quantity corresponding to 12% by weight of the total solids ($\gamma$-$Al_2O_3$ and lanthanum nitrate), as pre-cursor of a quantity of lanthanum oxide $La_2O_3$ corresponding to 5% by weight with respect to the total of $\gamma$-$Al_2O_3$ and lanthanum oxide.

The ceramic substrate was immersed in this slurry for a few minutes, until the pores were filled, as can be deduced from the lack of air release in the form of bubbles from the pores, and was then placed in an oven at 300° C. for a few minutes, in order to obtain the flash evaporation of the water. This procedure was repeated until a charge of stabilized $\gamma$-$Al_2O_3$ was obtained, equal to 3% by weight of the whole monolith, corresponding to a thickness layer in each pore of about 10 μm. Finally, the whole mixture was calcined at 800° C. for 3 hours.

The perovskitic $LaMnO_3$ was deposited on the support by the dry impregnation of the precursor salts, in this specific case with an equimolar solution of lanthanum nitrate and manganese acetate, 0.69 mM in each salt. The monolith was left to dry in air and calcined at 800° C. This procedure was repeated until 30% of $LaMnO_3$ was reached, with respect to the total weight of the support ($\gamma$-$Al_2O_3$ and $LaMnO_3$), followed by a final calcination at 1000° C.

The platinum was dispersed on the perovskite by the dry impregnation of a diluted solution, 0.1 mM, of platinum hexachloride ($H_2PtCl_6$) and then calcined in air at 800° C., until a charge of about 10% by weight was obtained, with respect to the total weight excluding the substrate (Pt+$LaMnO_3$+$\gamma$-$Al_2O_3$)

Experimental Plant

The catalytic activity measurement in the oxidative dehydrogenation of ethane at high flow-rates was effected on the catalyst thus prepared. In order to reduce the temperature drops by irradiation, two inert monoliths were positioned upstream and downstream of the catalyst, and the whole mixture was sealed with a woolen silica-alumina cloth in a quartz tube. The outer part of the quartz tube close to the reaction zone was then isolated with fiberglass.

The flow of gas to the reactor was controlled by means of mass flow controllers and was regulated at 5 slpm, corresponding to a space velocity of $2 \cdot 10^5$ $h^{-1}$, at atmospheric pressure and room temperature. The ethane : oxygen ratio was varied from 1.5 to 2 for a fixed nitrogen dilution equal to 30%, for the calibration of the gas chromatograph. The effect of the addition of hydrogen to the feeding for an ethane:oxygen ratio equal to 2, was also analyzed.

The pressure of the reactor was 1.3 atm in all the tests effected, whereas the reaction temperature remained at about 1000° C., and the contact time varied from 0.2 to 40 ms.

The gaseous products were fed to a gas chromatograph in line with the plant, through heated steel tubes. All the species were analyzed except for the $H_2O$, calculated by a balance with respect to the atomic oxygen.

The selectivity data presented in the figures were calculated on the basis of the carbon or hydrogen atoms. The change in the number of moles due to the chemical reactions was kept in consideration using the measurement of the $N_2$ concentration. As nitrogen is inert, the ratio between the number of moles of the products and the concentration of the same products at the outlet, is directly proportional to the ratio between the number of moles of $N_2$ fed and the concentration of $N_2$ at the outlet.

All the experimental measurements were reproducible within a range of ±2%.

The temperatures of the system were monitored and registered according to the variation in the feeding conditions. The reactor operated under stationary conditions and heat was supplied only for the purpose of obtaining ignition. After ignition, the heat source was removed and stationary conditions were reached over a certain time lapse (about 15 minutes). The quenching was effected by eliminating the oxygen flow followed by that of ethane.

In addition to the products indicated in the figures, traces of acetylene, propane, propene, butane and butene were found in the gaseous stream at the outlet.

All the results were repeatable over numerous hours of reaction.

Experimental Results

Ethane: Oxygen

Figure 1:
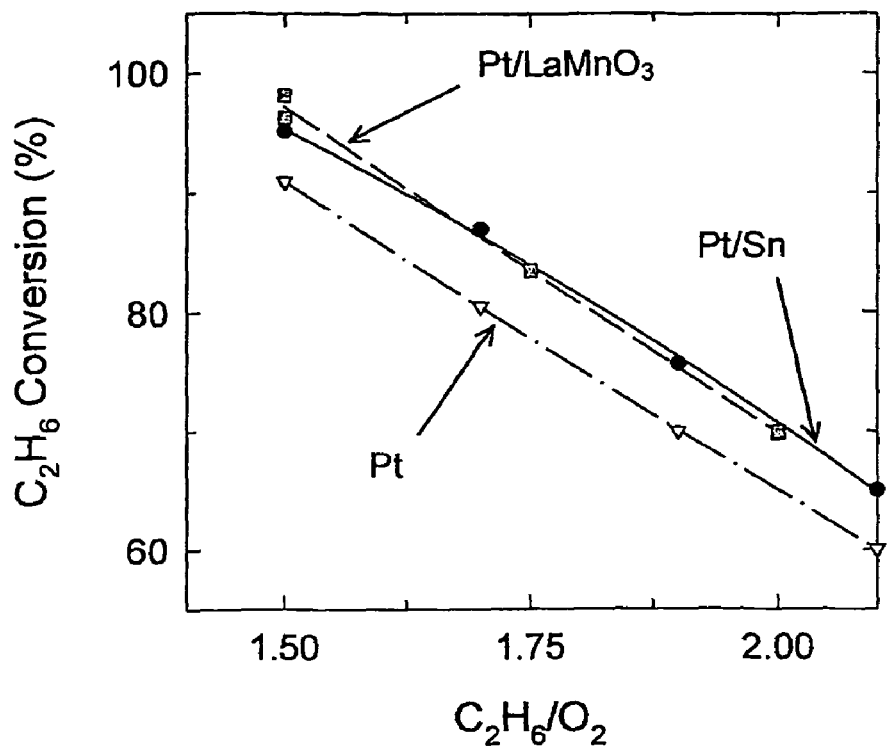
Figure 2:
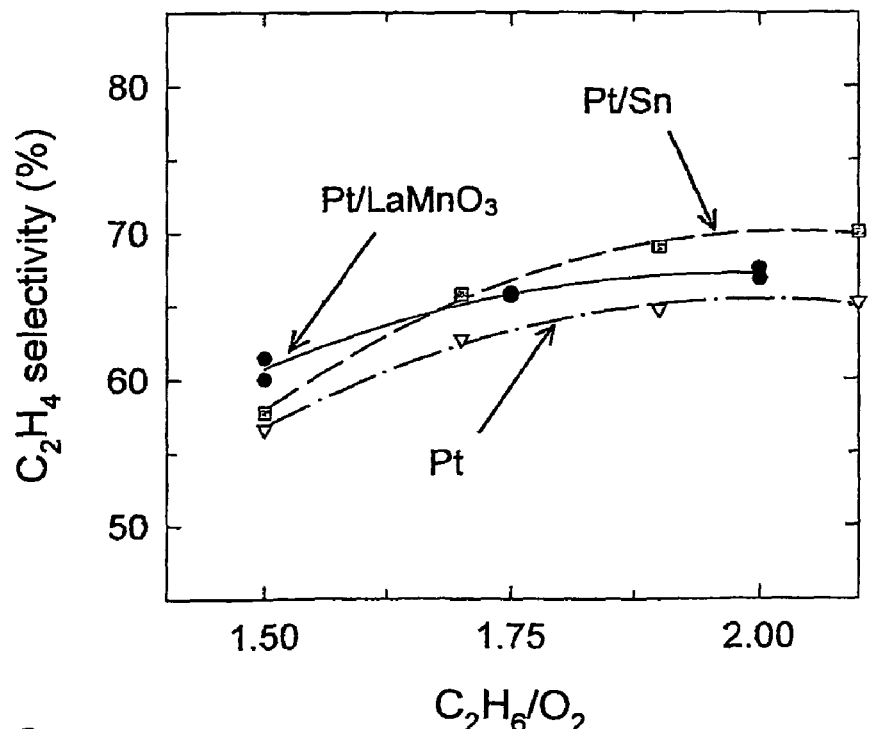
FIG. 2 shows the selectivity per carbon atom to ethylene in relation to the ethane:oxygen ratio for a catalyst based on Pt/LaMnO$_3$ supported on γ-Al$_2$O$_3$ and deposited on a 45 ppi (pores per linear inch) foam, compared with a catalyst based on Pt and Pt/Sn on the same ceramic substrate under the same experimental conditions specified in FIG. 1.
Figure 3:
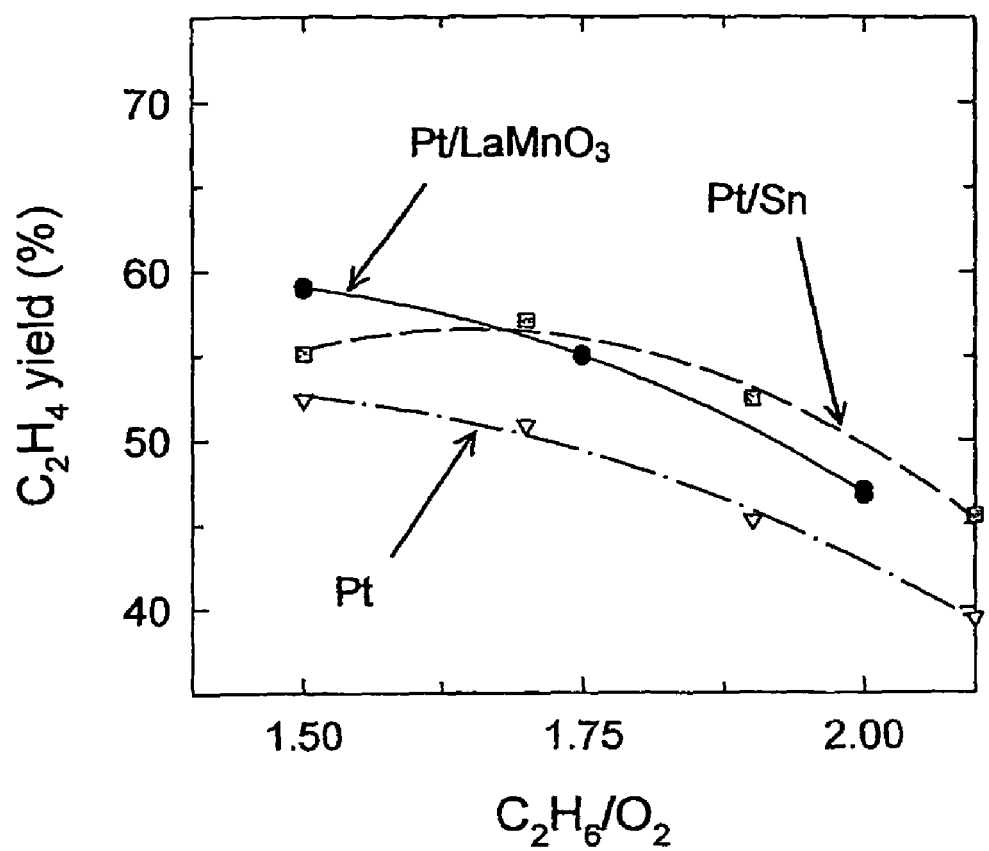
FIG. 3 shows the yield to ethylene in relation to the ethane:oxygen ratio for a catalyst based on Pt/LaMnO$_3$ supported on γ-Al$_2$O$_3$ and deposited on a 45 ppi (pores per linear inch) foam, compared with a catalyst based on Pt and Pt/Sn on the same ceramic substrate under the same experimental conditions specified in FIG. 1.

FIGS. 1, 2 and 3 respectively indicate the ethane conversion, the selectivity and yield to ethylene with a variation in the ethane:oxygen ratio in the feeding for a catalyst based on Pt/$LaMnO_3$ supported on $\gamma$-$Al_2O_3$ of the type object of the present patent, compared with data provided in literature (Yokoyama C., et al., Catal. Lett. 38;181 (1996)) for catalysts based on Pt and Pt/Sn on the same ceramic substrates and under the same experimental conditions (flow-rate of 5 slpm).

It can generally be said that with a decrease in the quantity of oxygen in the feeding, the ethane conversion decreases, whereas the selectivity to ethylene shows an increasing trend. It can also be seen that in terms of ethylene yield, the catalyst, object of the present patent, has performances comparable with those of the catalyst based on Pt/Sn, but it does not have the same deactivation problems due to the volatility of tin, and much higher performances with respect to Pt.

Figure 4:
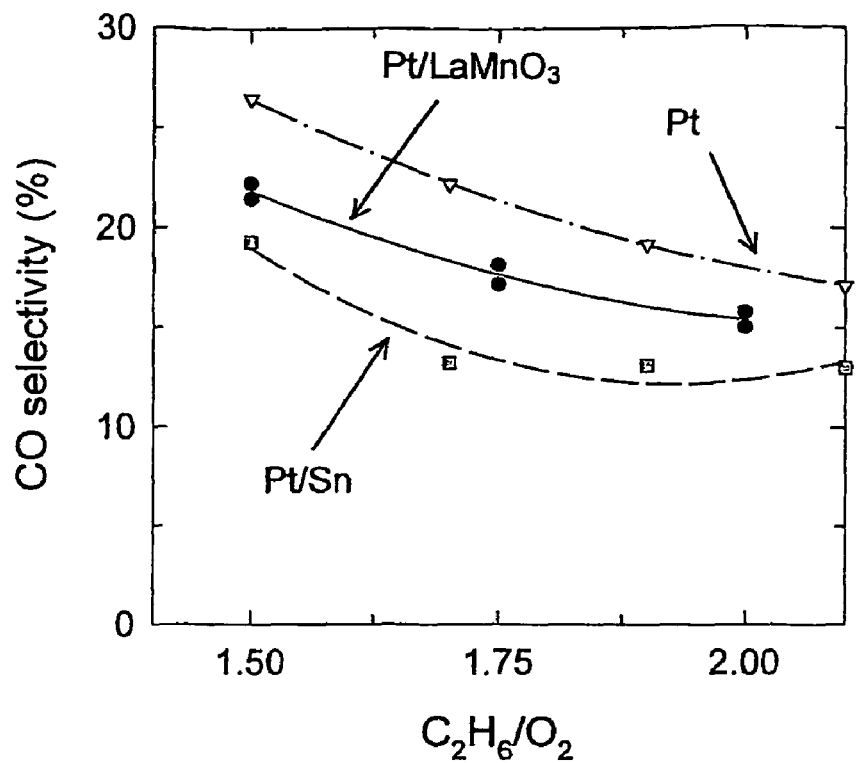
FIG. 4 shows the selectivity per carbon atom to CO in relation to the ethane:oxygen ratio for a catalyst based on Pt/LaMnO$_3$ supported on γ-Al$_2$O$_3$ and deposited on a 45 ppi (pores per linear inch) foam, compared with a catalyst based on Pt and Pt/Sn on the same ceramic substrate under the same experimental conditions specified in FIG. 1.
Figure 5:
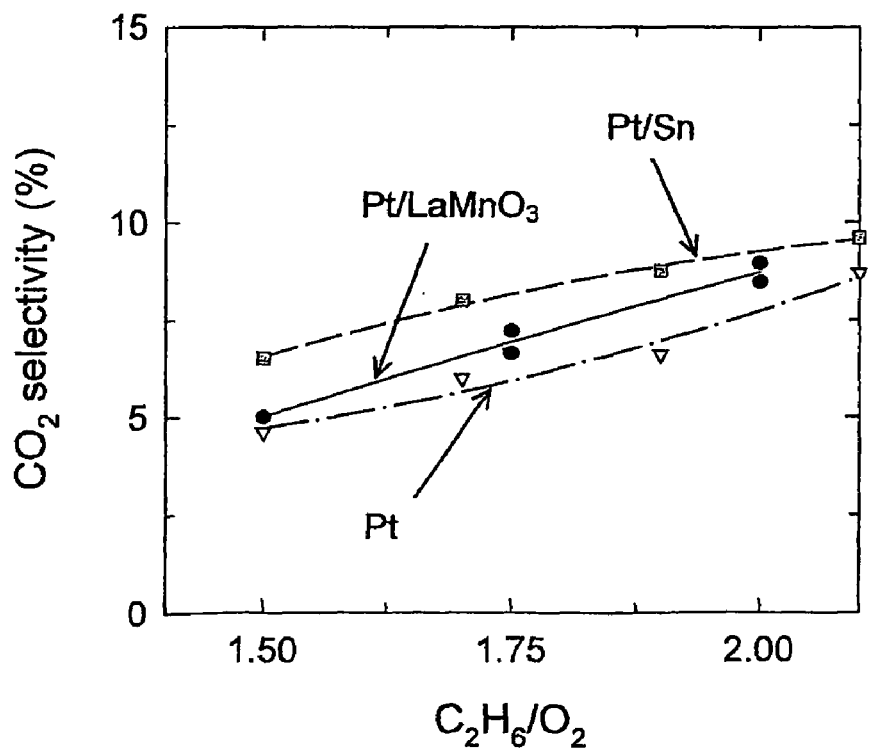
FIG. 5 shows the selectivity per carbon atom to CO$_2$ in relation to the ethane:oxygen ratio for a catalyst based on Pt/LaMnO$_3$ supported on γ-Al$_2$O$_3$ and deposited on a 45 ppi (pores per linear inch) foam, compared with a catalyst based on Pt and Pt/Sn on the same ceramic substrate under the same experimental conditions specified in FIG. 1.
Figure 6:
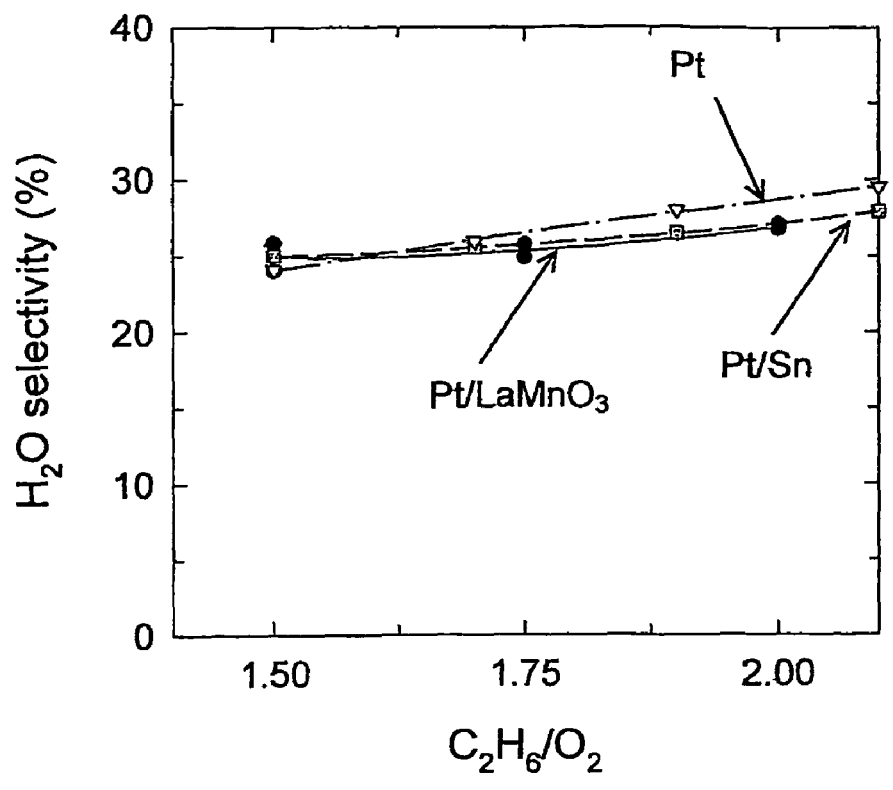
FIG. 6 shows the selectivity per hydrogen atom to H$_2$O in relation to the ethane:oxygen ratio for a catalyst based on Pt/LaMnO$_3$ supported on γ-Al$_2$O$_3$ and deposited on a 45 ppi (pores per linear inch) foam, compared with a catalyst based on Pt and Pt/Sn on the same ceramic substrate under the same experimental conditions specified in FIG. 1.

FIGS. 4 and 5 respectively indicate the selectivities to CO and $CO_2$ with a variation in the ethane:oxygen ratio. Higher quantities of CO and lesser quantities of $CO_2$ are produced on Pt, whereas the addition of Sn or the dispersion of Pt on the perovskite reduces the formation of CO in favour of $CO_2$ with a corresponding decrease in the formation of $H_2O$, as shown in FIG. 6.

Figure 7:
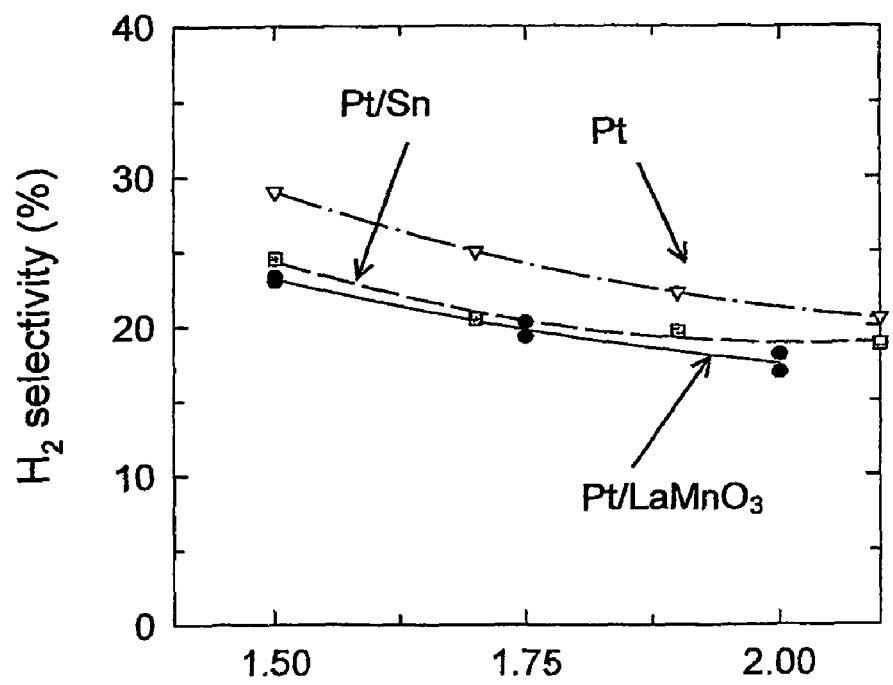
FIG. 7 shows the selectivity per hydrogen atom to H$_2$ in relation to the ethane:oxygen ratio for a catalyst based on Pt/LaMnO$_3$ supported on γ-Al$_2$O$_3$ and deposited on a 45 ppi (pores per linear inch) foam, compared with a catalyst based on Pt and Pt/Sn on the same ceramic substrate under the same experimental conditions specified in FIG. 1.

It appears that the greater tendency to oxidize the hydrogen instead of the oxygen, assumed in the work of Bodke et al (J. Catal. 191:62 (2000), also extends to the case of Pt dispersed by the perovskite. FIG. 7 in fact shows this catalyst and smaller quantities of $H_2$ are formed on Pt/Sn with respect to those formed on Pt.

Ethane:Oxygen:Hydrogen

The experimental data relating to the oxidative de-hydrogenation of ethane in mixtures containing hydrogen on supported Pt/$LaMnO_3$, are compared with the experimental data of Bodke et al. (J. Catal. 191:62 (2000), for Pt and Pt/Sn. The progressive addition of hydrogen causes a decrease in the ethane conversion, extremely significant on Pt, and less dramatic on Pt/LaMnO₃ supported on γ-Al₂O₃ and on Pt/Sn, as shown in FIG. 8. In correspondence with this decrease, the selectivity to ethylene increases with an increase in the quantity of hydrogen present in the feeding, and this increase is less in the case of the catalyst based on Pt (FIG. 9). The yields to ethylene are indicated in FIG. 10 and show an optimum for hydrogen:oxygen ratios ranging from 1 to 2.

FIG. 11 shows that higher quantities of $CH_4$ are formed on Pt with respect to the other two catalysts. In FIGS. 12 and 13, it can also be seen that higher quantities of CO and $CO_2$ are formed on Pt, whereas on Pt/Sn and on Pt/LaMnO₃ supported on γ-Al₂O₃, the selectivities to these species are substantially analogous.

FIG. 14 indicates the moles of $H_2$ formed per moles of $H_2$ fed. Only in the case of the catalyst proposed in this patent is the same quantity of $H_2$ obtained as that fed, and consequently the possibility of recycling $H_2$ to the reactor seems feasible.

The catalyst presented in this example, based on Pt/LaMnO₃ supported on γ-Al₂O₃ and deposited on a ceramic monolithic catalyst, did not show signs of deactivation even after numerous hours of reaction. The dispersion of Pt in very small particles on the perovskite does in fact seem to be effective in preventing cohesion phenomena between the particles themselves. The catalyst based on Pt/Sn, on the other hand, after a few operating hours, begins to show signs of deactivation due to the volatility of the tin.

The present invention has been described for purely illustrative and non-limiting purposes, according to its preferred embodiments. Variations and/or modifications, however, can be applied by experts in the field, all included in the relative protection scope, as defined by the enclosed claims.

The invention claimed is:

1. A multilayer catalyst for the partial oxidation of hydrocarbons in gaseous phase, characterized in that it comprises:
   a monolithic ceramic or metallic substrate having a solid macroporous structure consisting of one or more body structures having pores with an average hydraulic diameter greater than 0.2 mm;
   on which monolithic ceramic or metallic substrate there is deposited a supporting layer of an oxide with a large surface area of from 75 to 200 m²/g;
   on which supporting layer there is deposited a first active layer with a crystalline perovskitic structure having the general formula

wherein:
   A is a cation of at least one of the rare earth elements,
   A' is a cation of at least one element selected from the group consisting of group Ia elements, group IIa elements, and group VIa elements of the periodic table,
   B is a cation of at least one element selected from the group consisting of group IVb elements, group Vb elements, group VIb elements, group VIIb elements, and group VIII elements of the periodic table,
   B' is a cation of at least one element selected from the group consisting of group IVb elements, group Vb elements, group VIb elements, group VIIb elements, and group VIII elements of the periodic table, $Mg^{2+}$ or $Al^{3+}$,
   x is a number which is such that $0 \leq x \leq 1$,
   y is a number which is such that $0 \leq y \leq 1$, and
   δ is a number which is such that $0 \leq \delta \leq 0.5$; and
   on which first active layer there is deposited a second more external active layer consisting of a dispersion of a noble metal.

2. The multilayer catalyst according to claim 1, characterized in that said solid macroporous structure of said monolithic ceramic or metallic substrate has pores with an average hydraulic diameter greater than 0.2 mm and with channels having a linear and parallel, or convoluted form.

3. The multilayer catalyst according to claim 2, characterized in that said average hydraulic diameter of the pores is lower than 1 mm.

4. The multilayer catalyst according to any one of claims 1-3, characterized in that said monolithic ceramic or metallic substrate consists of a material which is not active in the reactions of interest and has a low thermal expansion coefficient.

5. The multilayer catalyst according to claim 1, characterized in that said monolithic ceramic or metallic substrate consists of a material which can resist temperatures close to 1000° C., and is chemically and physically stable, with no oxidation phenomena, or separation, volatility or phase transition at said temperatures.

6. The multilayer catalyst according to claim 1, characterized in that said monolithic ceramic substrate consists of an oxide or a combination of oxides.

7. The multilayer catalyst according to claim 6, characterized in that said monolithic ceramic substrate consists of an oxide selected from the group consisting of $Al_2O_3$ (in the form of $\alpha$-$Al_2O_3$), $SiC$, $SiO_2$, $ZrO_2$, $Y_2O_3$, $CaO$, $MgO$ and combinations thereof.

8. The multilayer catalyst according to claim 6, characterized in that said monolithic ceramic substrate is in the form of ceramic foam or in the form of a ceramic honeycomb monolith.

9. The multilayer catalyst according to claim 1, characterized in that said monolithic metallic substrate consists of an alloy of metals resistant to oxidation at high temperatures.

10. The multilayer catalyst according to claim 9, characterized in that said monolithic metallic substrate is in the form of a metallic foam or consists of a rolled-up metallic sheet and a corrugated sheet.

11. The multilayer catalyst according to claim 1, characterized in that said first active layer having a crystalline perovskitic structure, consists of an oxide which is thermally stable at a temperature of 1000° C.

12. The multilayer catalyst according to claim 11, characterized in that said first active layer having a crystalline perovskitic structure consists of an oxide with a good oxidation activity with respect to CO.

13. The multilayer catalyst according to claim 1, characterized in that in the general formula

A is a cation of at least one element selected from the group consisting of La, Ce, Pr, Nd, Sm, Eu, Dy, Ho and Er;
A' is a cation of at least one element selected from the group consisting of Na, K, Ca, Sr, Ba, and Rb;
B is a cation of at least one element selected from the group consisting of Ti, Cr, Fe, Ru, Co, Rh, Ni, and Mn; and
B' is a cation of at least one element selected from the group consisting of Ti, Cr, Fe, Ru, Co, Rh, Ni, Mn, Pt, Nb, Ta, Mo, and W.

14. The multilayer catalyst according to claim 13, characterized in that said B is a cation of an element selected from the group consisting of Cr, Fe, Co, Mn, Ni and Ru and said B' is a cation of an element selected from the group consisting of Cr, Fe, Co, Mn, Ni, Mo, W and Ru.

15. The multilayer catalyst according to claim 1, characterized in that said first active layer having a crystalline perovskitic structure consists of $LaMnO_3$.

16. The multilayer catalyst according to claim 1, characterized in that said first active layer with a crystalline perovskitic structure is present in quantities of between 5 and 50% by weight, with respect to the sum of said first active layer and said supporting layer.

17. The multilayer catalyst according to claim 1, characterized in that said second more external active layer consists of a dispersion of a noble metal selected from the group consisting of Pt, Pd, Rh, Ir, Re, Au, and mixtures thereof.

18. The multilayer catalyst according to claim 1, characterized in that said second more external active layer consists of a dispersion of Pt.

19. The multilayer catalyst according to claim 1, characterized in that said second more external active layer is present in quantities of between 0.1 and 25% of the total weight of the catalyst, excluding the monolithic substrate.

20. The multilayer catalyst according to claim 18, characterized in that the amount of said second active external layer ranges from 0.1 and 15% of the total weight of the catalyst, excluding the monolithic substrate.

21. The multilayer catalyst according to claim 18, characterized in that the amount of said second active external layer ranges from 1.0 and 10% of the total weight of the catalyst, excluding the monolithic substrate.

22. The multilayer catalyst according to claim 1, characterized in that said supporting layer of an oxide with a large surface area consists of a material having a good chemical affinity with the material forming said ceramic monolithic or metallic substrate.

23. The multilayer catalyst according to claim 22, characterized in that said supporting layer of an oxide with a large surface area consists of a non-active oxide in the reactions of interest, with a large surface area and a low thermal expansion coefficient which is compatible with that of said monolithic substrate.

24. The multilayer catalyst according to claim 23, characterized in that said supporting layer of an oxide with a large surface area consists of MgO, $MgAl_2O_4$, $Y-Al_2O_3$ stabilized or not by $La_2O_3$ or another stabilizer, or $ZrO_2$ stabilized or not by $La_2O_3$ or another stabilizer, or mixtures thereof.

25. The multilayer catalyst according to claim 24, characterized in that said stabilization is obtained by means of a quantity of $La_2O_3$ or another stabilizer of between 5 and 10% by weight with respect to the total weight of said supporting layer with a large surface area.

26. The multilayer catalyst according to claim 1, characterized in that the thickness of said supporting layer of an oxide having a high surface area varies from a minimum of 5 μm to a maximum of 50% of the average radius of the pores of said substrate.

27. A process for the preparation of a multilayer catalyst as defined in claim 1, characterized in that it comprises the following phases in succession:
  deposition of said supporting layer having a large surface area on said ceramic or metallic monolithic substrate,
  deposition of said first active layer with a perovskitic crystalline structure on said supporting layer having a large surface area,
  deposition of said second more external active layer consisting of a dispersion of a noble metal on said first active layer with a crystalline perovskitic structure, and
  calcination in air at temperatures ranging from 700 to 1000° C.

28. The process for the preparation of a multilayer catalyst according to claim 27, characterized in that said deposition of said first active layer having a crystalline perovskitic structure on said supporting layer with a large surface area, is effected through the following sub-phases:
  impregnation with a water solution containing soluble compounds of the cations A, A', B and B' in the proportions corresponding to those of the desired final formulation, and
  air calcination at temperatures ranging from 800 to 1000° C., for a time of between 2 hrs and 10 hrs.

29. The process for the preparation of a multilayer catalyst according to claim 28, characterized in that said impregnation in said water solution is effected through a wet impregnation or dry impregnation process.

30. The process for the preparation of a multilayer catalyst according to claim 27, characterized in that said deposition of said first active layer having a crystalline perovskitic structure on said supporting layer with a large surface area, is effected through the following sub-phases:
  in situ deposition-precipitation starting from the soluble compounds of the cations A, A', B and B' in a water solution through the slow decomposition of urea at 90° C.;
  washing;
  drying; and
  air calcination at temperatures ranging from 800 to 1000° C.

31. The process for the preparation of a multilayer catalyst according to claim 27, characterized in that said deposition of said first active layer having a crystalline perovskitic structure on said supporting layer with a large surface area, is effected by means of a process comprising the sol-gel method, or by the citrates method.

32. The process for the preparation of a multilayer catalyst according to claim 27, characterized in that said deposition of said second more external active layer on said first active layer with a crystalline perovskitic structure, is effected through the following sub-phases:
  dry or wet impregnation in a salt solution of said noble metal in proportions corresponding to those of the desired final formulation, and
  air calcination at temperatures ranging from 600 to 800° C., for a time of between 2 hrs and 10 hrs.

33. The process for the preparation of a multilayer catalyst according to claim 32, characterized in that said impregnation in said salt solution of said noble metal is effected through a wet or dry process.

34. The process for the preparation of a multilayer catalyst according to claim 27, characterized in that it includes the following additional phases, which precede the deposition phase of said first active layer with a crystalline perovskitic structure:
  deposition of a supporting layer with a large surface area on said ceramic or metallic monolithic substrate,
  air calcination for about 3 hrs at high temperature of 800° C.

35. The process for the preparation of a multilayer catalyst according to claim 34, characterized in that said deposition of a supporting layer with a large surface area on a ceramic or metallic monolithic substrate includes the following sub-phases, cyclically repeated until the desired thickness is reached:
  immersion of said substrate in a water solution containing a finely ground powder of supporting material, and
  elimination from the substrate of the excess solution.

36. The process for the preparation of a multilayer catalyst according to claim 35, characterized in that said water solution containing a finely ground powder of supporting material in which said monolithic substrate is immersed, also contains a stabilizer precursor.

37. The process for the preparation of a multilayer catalyst according to claim 35 or 36, characterized in that said water solution containing a finely ground powder of supporting material in which said monolithic substrate is immersed, further contains a ligand in a weight percentage with respect to the total of up to 30% of said supporting material and nitric acid in a weight percentage of between 10 and 30% of said ligand.

38. The process for the preparation of a multilayer catalyst according to claim 35, characterized in that said elimination from the substrate of the excess solution is obtained through removal by means of compressed air and subsequent air calcination at temperature close to 550° C.

39. The process for the preparation of a multilayer catalyst according to claim 35, characterized in that said elimination from the substrate of the excess solution is obtained by flash evaporation of the water by placing the impregnated monolith, for a few minutes, in an oven at a temperature higher than the water evaporation temperature.

40. A partial oxidation process for the production of olefins, starting from a gaseous stream of hydrocarbons vaporizable within the temperature range of 25 and 400° C. and pressures of between 0.1 and 5 atm, and oxygen, characterized in that said gaseous stream passes through a catalytic bed consisting of particles of the multilayer catalyst as defined in claim 1, said hydrocarbons including alkanes in the range of $C_2$ to $C_{20}$, said gaseous stream further containing a quantity of oxygen which is such that the ratio between the hydrocarbons and oxygen is within the range of 0.8-3, in any case always higher than the upper flammability limit of the mixture, and a quantity of nitrogen ranging from 0 to 50% with respect to the total, said process being carried out at a pressure ranging from 0.1 to 5 MPa, a temperature of between 600 and 1200° C., with a space velocity of between $1 \cdot 10^7$ and $1 \cdot 10^3$ hr$^{-1}$.

41. The partial oxidation process according to claim 40, characterized in that said alkanes comprise at least one of the products selected from ethane, propane, butane or a mixture thereof.

42. The partial oxidation process according to claim 40, characterized in that said ratio between hydrocarbons and oxygen is within the range of 1.25 to 3.

43. The partial oxidation process according to any of the claim 40, characterized in that the amount of methane in said hydrocarbon gaseous stream is not higher than 20% by weight of the total weight of hydrocarbons.

44. The partial oxidation process according to any of the claim 40, characterized in that the amount of methane in said hydrocarbon gaseous stream is not higher than 5% by weight of the total weight of hydrocarbons, or preferably substantially absent.

45. The partial oxidation process according to any of the claim 40, characterized in that said pressure ranges from 101 to 3,000 kPa.

46. The partial oxidation process according to any of the claim 40, characterized in that said temperature is within the range of 800-1000° C.

47. The partial oxidation process according to any of the claim 40, characterized in that said space velocity is between $3 \cdot 10^6$ and $3 \cdot 10^4$ hr$^{-1}$.

48. The partial oxidation process according to any of the claim 40, characterized in that said gaseous stream further contains a quantity of hydrogen, freshly fed or recycled following the separation of the products, which is such that the ratio between hydrogen and oxygen ranges from 0 to 3.

49. A partial oxidation process according to claim 40, characterized in that said gaseous stream further includes a quantity of CO freshly fed or recycled following the separation of the products, which is such that the ratio between CO and oxygen ranges between 0 and 3.

50. The partial oxidation process according to any of the claim 40, characterized in that said gaseous stream of vaporizable hydrocarbons is pre-heated between 25 and 400° C.

51. The partial oxidation process according to any of the claim 40, characterized in that before and after said catalytic bed there is a layer of ceramic monoliths.

52. The multilayer catalyst according to claim 19, characterized in that said second more external active layer consists of a dispersion of a noble metal selected from the group consisting of Pt, Pd, Rh, Ir, Re, Au, and mixtures thereof.

53. The multilayer catalyst according to claim 52, characterized in that the amount of said second active external layer ranges from 0.1 and 15% of the total weight of the catalyst, excluding the monolithic substrate.

54. The multilayer catalyst according to claim 52, characterized in that the amount of said second active external layer ranges from 1.0 and 10% of the total weight of the catalyst, excluding the monolithic substrate.

* * * * *